(12) United States Patent
Turney et al.

(10) Patent No.: US 11,009,252 B2
(45) Date of Patent: *May 18, 2021

(54) HVAC CONTROL SYSTEM WITH COST TARGET OPTIMIZATION

(71) Applicant: Johnson Controls Technology Company, Auburn Hills, MI (US)

(72) Inventors: Robert D. Turney, Watertown, WI (US); Jiaqi Li, Beijing (CN)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,924

(22) Filed: May 6, 2019

(65) Prior Publication Data

US 2019/0338977 A1 Nov. 7, 2019

Related U.S. Application Data

(60) Provisional application No. 62/667,901, filed on May 7, 2018.

(51) Int. Cl.
*F24F 11/63* (2018.01)
*F24F 11/52* (2018.01)
(Continued)

(52) U.S. Cl.
CPC ............. *F24F 11/63* (2018.01); *F24F 11/47* (2018.01); *F24F 11/52* (2018.01); *F24F 2110/10* (2018.01)

(58) Field of Classification Search
CPC .. F24F 11/63; F24F 11/52; F24F 11/47; F24F 2110/10; F24F 2110/70; F24F 2110/50;
(Continued)

(56) References Cited

U.S. PATENT DOCUMENTS

| 5,135,045 A | 8/1992 | Moon |
| 6,780,011 B2 | 8/2004 | Davidov et al. |

(Continued)

FOREIGN PATENT DOCUMENTS

| CN | 101140450 | 3/2008 |
| CN | 102375443 | 3/2012 |

(Continued)

OTHER PUBLICATIONS

U.S. Appl. No. 15/920,077, filed Mar. 13, 2018, Johnson Controls Technology Company.

(Continued)

*Primary Examiner* — Michael J Huntley
(74) *Attorney, Agent, or Firm* — Foley & Lardner LLP

(57) ABSTRACT

A building management system includes HVAC equipment operable to affect an indoor air temperature of a building, a system manager configured to obtain a cost function that characterizes a cost of operating the HVAC equipment, obtain a dataset relating to the building, determine a current state of the building by applying the dataset to a neural network, select a temperature bound associated with the current state, augment the cost function to include a penalty term that increases the cost when the indoor air temperature violates the temperature bound, and determine a temperature setpoint for each of a plurality of time steps in the future time period. The temperature setpoints achieve a target value of the cost function over the future time period. The building management system also includes a controller configured to operate the HVAC equipment to drive the indoor air temperature towards the temperature setpoint.

20 Claims, 12 Drawing Sheets

(51) Int. Cl.
*F24F 11/47* (2018.01)
*F24F 110/10* (2018.01)

(58) Field of Classification Search
CPC ........ F24F 11/64; F24F 2110/20; F24F 11/58; F24F 11/54
See application file for complete search history.

(56) References Cited

U.S. PATENT DOCUMENTS

| | | |
|---|---|---|
| 7,580,775 B2 | 8/2009 | Kulyk et al. |
| 7,894,946 B2 | 2/2011 | Kulyk et al. |
| 8,527,108 B2 | 9/2013 | Kulyk et al. |
| 8,527,109 B2 | 9/2013 | Kulyk et al. |
| 8,918,223 B2 | 12/2014 | Kulyk et al. |
| 9,110,647 B2 | 8/2015 | Kulyk et al. |
| 9,250,633 B2 | 2/2016 | Chen et al. |
| 9,429,923 B2 | 8/2016 | Ward et al. |
| 9,703,339 B2 | 7/2017 | Kulyk et al. |
| 10,139,877 B2 | 11/2018 | Kulyk et al. |
| 10,146,237 B2 | 12/2018 | Turney et al. |
| 2007/0168057 A1* | 7/2007 | Blevins ................ G05B 13/022 700/53 |
| 2007/0231119 A1* | 10/2007 | Shen .................... F04D 27/004 415/47 |
| 2011/0106328 A1* | 5/2011 | Zhou ................... G05B 13/024 700/291 |
| 2013/0013118 A1 | 1/2013 | Merkulov et al. |
| 2013/0013124 A1 | 1/2013 | Park et al. |
| 2014/0288890 A1 | 9/2014 | Khainson et al. |
| 2015/0168003 A1* | 6/2015 | Stefanski ................ F24F 11/70 165/237 |
| 2015/0316901 A1 | 11/2015 | Wenzel et al. |
| 2016/0305678 A1* | 10/2016 | Pavlovski ................ F24F 11/62 |
| 2017/0003150 A1* | 1/2017 | Noboa .................... F25B 13/00 |
| 2017/0211830 A1 | 7/2017 | Kosaka et al. |
| 2017/0364105 A1* | 12/2017 | Greene .............. G05D 23/1904 |
| 2018/0197253 A1 | 7/2018 | Elbsat et al. |
| 2018/0224814 A1 | 8/2018 | Elbsat et al. |
| 2018/0285800 A1 | 10/2018 | Wenzel et al. |
| 2018/0313557 A1 | 11/2018 | Turney et al. |
| 2018/0357577 A1 | 12/2018 | Elbsat et al. |
| 2019/0079473 A1 | 3/2019 | Kumar et al. |
| 2019/0158305 A1 | 5/2019 | Cui et al. |
| 2019/0171171 A1 | 6/2019 | Verteletskyi et al. |
| 2019/0187634 A1 | 6/2019 | Fan et al. |
| 2019/0287147 A1 | 9/2019 | Ingale et al. |
| 2019/0338973 A1 | 11/2019 | Turney et al. |
| 2020/0072543 A1 | 3/2020 | Turney et al. |

FOREIGN PATENT DOCUMENTS

| | | | |
|---|---|---|---|
| CN | 104620182 | 5/2015 | |
| CN | 105247519 A | * 1/2016 | ............. G06Q 10/06 |
| JP | 2009-518750 | 5/2009 | |
| JP | 2017-133707 A | 8/2017 | |
| WO | WO-2016/201353 A1 | 12/2016 | |

OTHER PUBLICATIONS

U.S. Appl. No. 16/122,399, filed Sep. 5, 2018, Johnson Controls Technology Company.
U.S. Appl. No. 16/404,030, filed May 6, 2019, Johnson Controls Technology Company.
Batterman, Stuart. Review and Extension of CO2-Based Methods to Determine Ventilation Rates with Application to School Classrooms. International Journal of Environmental Research and Public Health. Feb. 4, 2017. 22 Pages.
Chen, Xiao; Wang, Qian; Srebric, Jelena. Occupant Feedback Based Model Predictive Control for Thermal Comfort and Energy Optimization: A Chamber Experimental Evaluation. Applied Energy 164. 2016, pp. 341-351.
Kang et al., Novel Modeling and Control Strategies for a HVAC System Including Carbon Dioxide Control. Jun. 2, 2014. 19 Pages.
Lampinen, Markku J. Thermodynamics of Humid Air. Sep. 2015. 39 Pages.
Luo, Xiaoyan. Maximizing Thermal Comfort and International Design. Loughborough University. Jan. 18, 2019. 4 Pages.
Sama Agnniaey et al., The Assumption of Equidistance in the Seven-Point Thermal Sensation Scale and a Comparison between Categorical and Continuous Metrics. University of Georgia College of Engineering, Jan. 18, 2019. 4 Pages.
Sudhakaran, Saurabh; Shaurette Mark. Temperature, Relative Humidity, and CarbonDioxide Modulation in a Near-Zero Energy Efficient Retrofit House. Purdue University. 2016, 11 Pages.
Weekly, Kevin et al., Modeling and Estimation of the Humans' Effect on the CO2 Dynamics Inside a Conference Room. IEEE Transactions on Control Systems Technology, vol. 23, No. 5, Sep. 2015, 12 pages.
Ward et al., "Beyond Comfort—Managing the Impact of HVAC Control on the Outside World," Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008, 15 pages.
Office Action on IN 201944017378, dated Jul. 29, 2020, 6 pages.
Office Action on JP 2019-086368, dated Jul. 28, 2020, 7 pages with English translation.
Office Action on CN 201910372048.8, dated Sep. 17, 2020, 30 pages with English language translation.

* cited by examiner

HVAC CONTROL SYSTEM WITH COST TARGET OPTIMIZATION

CROSS-REFERENCE TO RELATED APPLICATION

This application claims priority to and the benefit of U.S. Provisional Patent Application No. 62/667,901 filed May 7, 2018, the entire disclosure of which is incorporated by reference herein.

BACKGROUND

The present disclosure relates generally to building management systems for managing energy costs in HVAC systems. HVAC systems provided heating, cooling, and ventilation for buildings. Minimizing energy consumption of HVAC systems may lead to discomfort for occupants of the building because comfortable temperatures cannot be maintained without increased power, while matching occupant temperature preferences at all times typically leads to high energy costs. Thus, systems and methods are needed to reduce energy consumption of HVAC systems without leading to occupant discomfort.

SUMMARY

One implementation of the present disclosure is a building management system. The building management system includes HVAC equipment operable to affect an indoor air temperature of a building, a system manager configured to obtain a cost function that characterizes a cost of operating the HVAC equipment over a future time period, obtain a dataset comprising a plurality of data points relating to the building, determine a current state of the building by applying the dataset to a neural network configured to classify the current state of the building, select a temperature bound associated with the current state, augment the cost function to include a penalty term that increases the cost when the indoor air temperature violates the temperature bound, and determine a temperature setpoint for each of a plurality of time steps in the future time period. The temperature setpoints achieve a target value of the cost function over the future time period. The building management system also includes a controller configured to operate the HVAC equipment to drive the indoor air temperature towards the temperature setpoint for a first time step of the plurality of time steps.

In some embodiments, the temperature bound includes an upper limit on the indoor air temperature and a lower limit on the indoor air temperature. In some embodiments, the penalty term is zero when the indoor air temperature is between the upper limit and the lower limit. The penalty term is non-zero when the indoor air temperature is above the upper limit or below the lower limit.

In some embodiments, the temperature bound includes a first temperature bound that includes a first upper limit on the indoor air temperature and a first lower limit on the indoor air temperature, and a second temperature bound that includes a second upper limit on the indoor air temperature and a second lower limit on the indoor air temperature. In some embodiments, the penalty term increases the cost by a first amount when the first temperature bound is violated and by a second amount when the second temperature bound is violated, the second amount greater than the first amount. In some embodiments, the first upper limit is less than the second upper limit and the first lower limit is greater than the second lower limit.

In some embodiments, the system manager is configured to store a mapping between a plurality of possible states of the building and a plurality of possible temperature bounds. The plurality of possible states includes the current state and the plurality of possible temperature bounds includes the temperature bound.

In some embodiments, the HVAC equipment includes an airside system and a waterside system.

Another implementation of the present disclosure is a method. The method includes obtaining a cost function that characterizes a cost of operating building equipment over a future time period. The building equipment is configured to affect an indoor air temperature of one or more buildings. The method also includes obtaining a dataset that includes a plurality of data points relating to the one or more buildings, determining a current state of the one or more buildings by applying the dataset to a neural network configured to classify the current state of the one or more buildings, selecting a temperature bound associated with the current state, augmenting the cost function to include a penalty term that increases the cost when the indoor air temperature violates the temperature bound, and determining a temperature setpoint for each of a plurality of time steps in the future time period. The temperature setpoints achieve a target value of the cost function over the future time period. The method includes controlling the building equipment to drive the indoor air temperature towards the temperature setpoint for a first time step of the plurality of time steps.

In some embodiments, the temperature bound includes an upper limit on the indoor air temperature and a lower limit on the indoor air temperature, the penalty term is zero when the indoor air temperature is between the upper limit and the lower limit, and the penalty term is non-zero when the indoor air temperature is above the upper limit or below the lower limit. In some embodiments, the first upper limit is less than the second upper limit and the first lower limit is greater than the second lower limit. The penalty term increases the cost by a first amount when the first temperature bound is violated and by a second amount when the second temperature bound is violated. The second amount is greater than the first amount.

In some embodiments, the method includes prompting a user to input the target value of the cost function via a graphical user interface. In some embodiments, the method includes displaying a graphical representation of the temperature bound for the future time period and the temperature setpoints for the future time period. In some embodiments, the building equipment includes an airside system and a waterside system.

Another implementation of the present disclosure is one or more non-transitory computer-readable media containing program instructions that, when executed by one or more processors, cause the one or more processors to perform operations. The operations include obtaining a cost function that characterizes a cost of operating building equipment over a future time period. The building equipment is configured to affect an indoor air temperature of one or more buildings. The operations also include obtaining a dataset comprising a plurality of data points relating to the one or more buildings, determining a current state of the one or more buildings by applying the dataset to a neural network configured to classify the current state of the one or more buildings, selecting a temperature bound associated with the current state, augmenting the cost function to include a penalty term that increases the cost when the indoor air temperature violates the temperature bound, and determining a temperature setpoint for each of a plurality of time steps in the future time period. The temperature setpoints achieve target value of the cost function over the future time period. The method also includes controlling the building equipment to drive the indoor air temperature towards the temperature setpoint for a first time step of the plurality of time steps.

In some embodiments, the temperature bound includes an upper limit on the indoor air temperature and a lower limit on the indoor air temperature, the penalty term is zero when the indoor air temperature is between the upper limit and the lower limit, and the penalty term is non-zero when the indoor air temperature is above the upper limit or below the lower limit.

In some embodiments, the temperature bound includes a first temperature bound that includes a first upper limit on the indoor air temperature and a first lower limit on the indoor air temperature and a second temperature bound that includes a second upper limit on the indoor air temperature and a second lower limit on the indoor air temperature.

In some embodiments, the one or more non-transitory computer-readable media store a mapping between a plurality of possible states of the one or more buildings and a plurality of possible temperature bounds. The plurality of possible states includes the current state and the plurality of possible temperature bounds includes the temperature bound.

DETAILED DESCRIPTION

Building HVAC Systems and Building Management Systems

Figure 1:
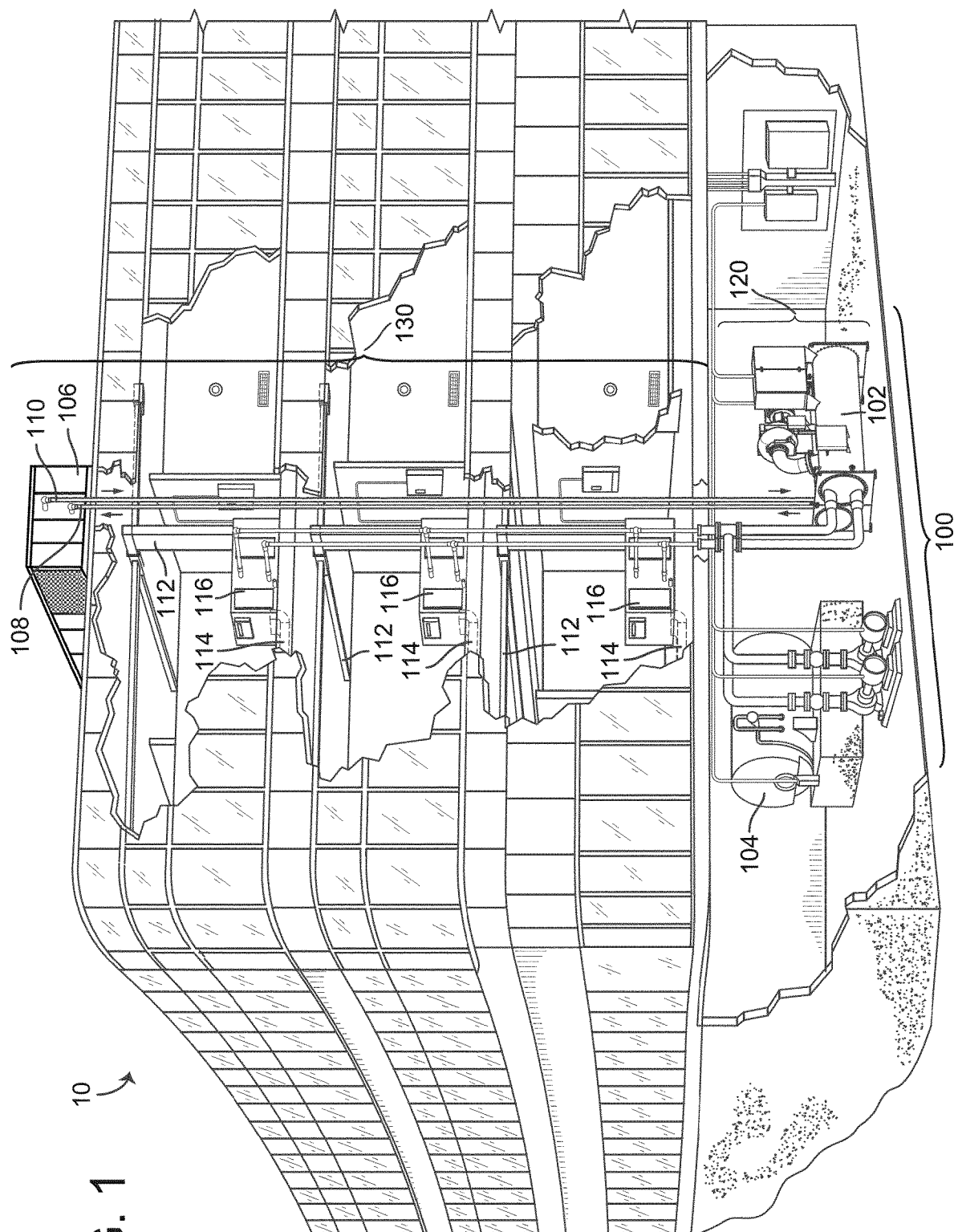
FIG. 1 is a drawing of a building equipped with a HVAC system, according to an exemplary embodiment.
Figure 2:
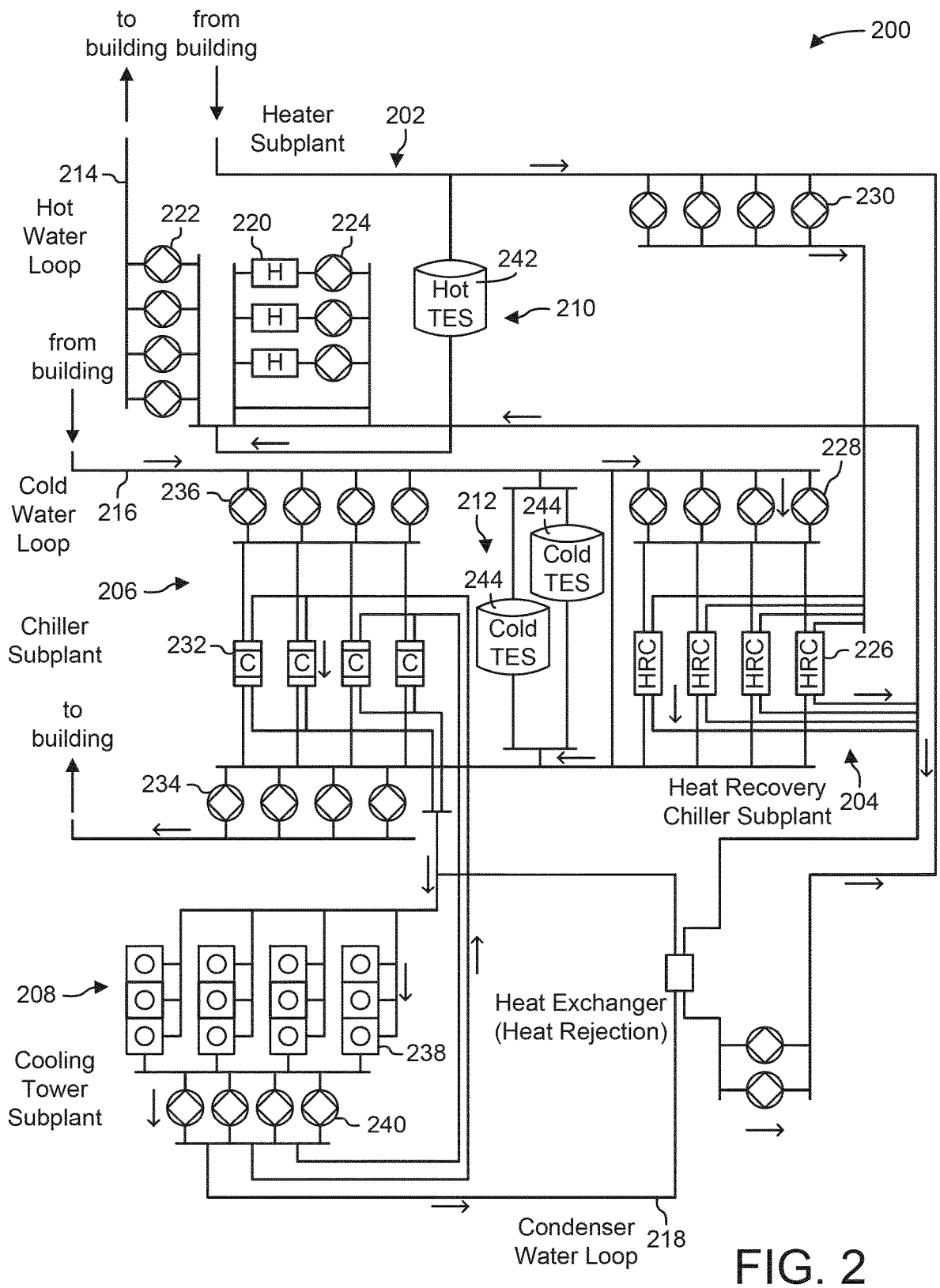
FIG. 2 is a block diagram of a waterside system which can be used to serve the building of FIG. 1, according to an exemplary embodiment.
Figure 3:
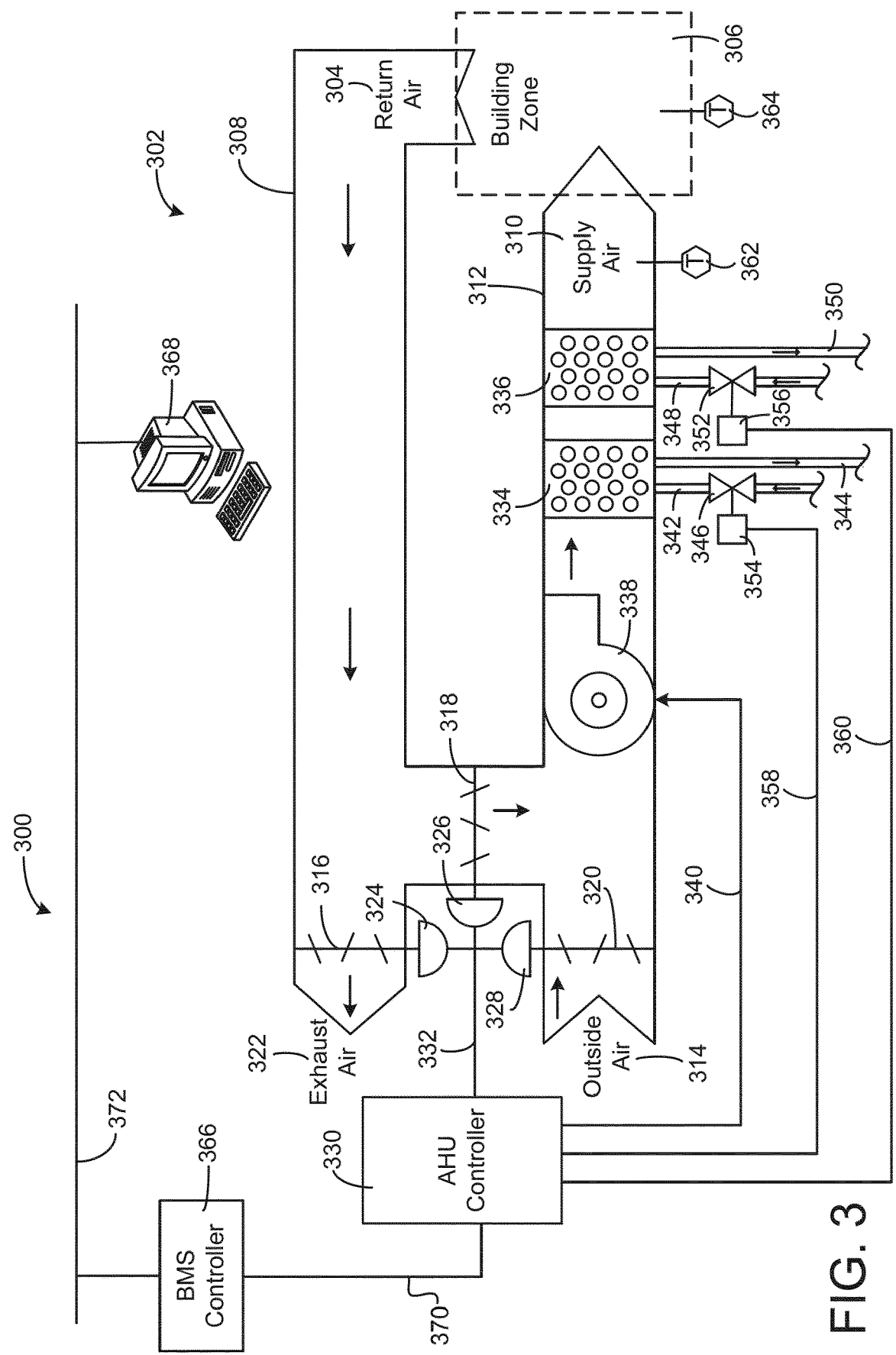
FIG. 3 is a block diagram of an airside system which can be used to serve the building of FIG. 1, according to an exemplary embodiment.
Figure 4:
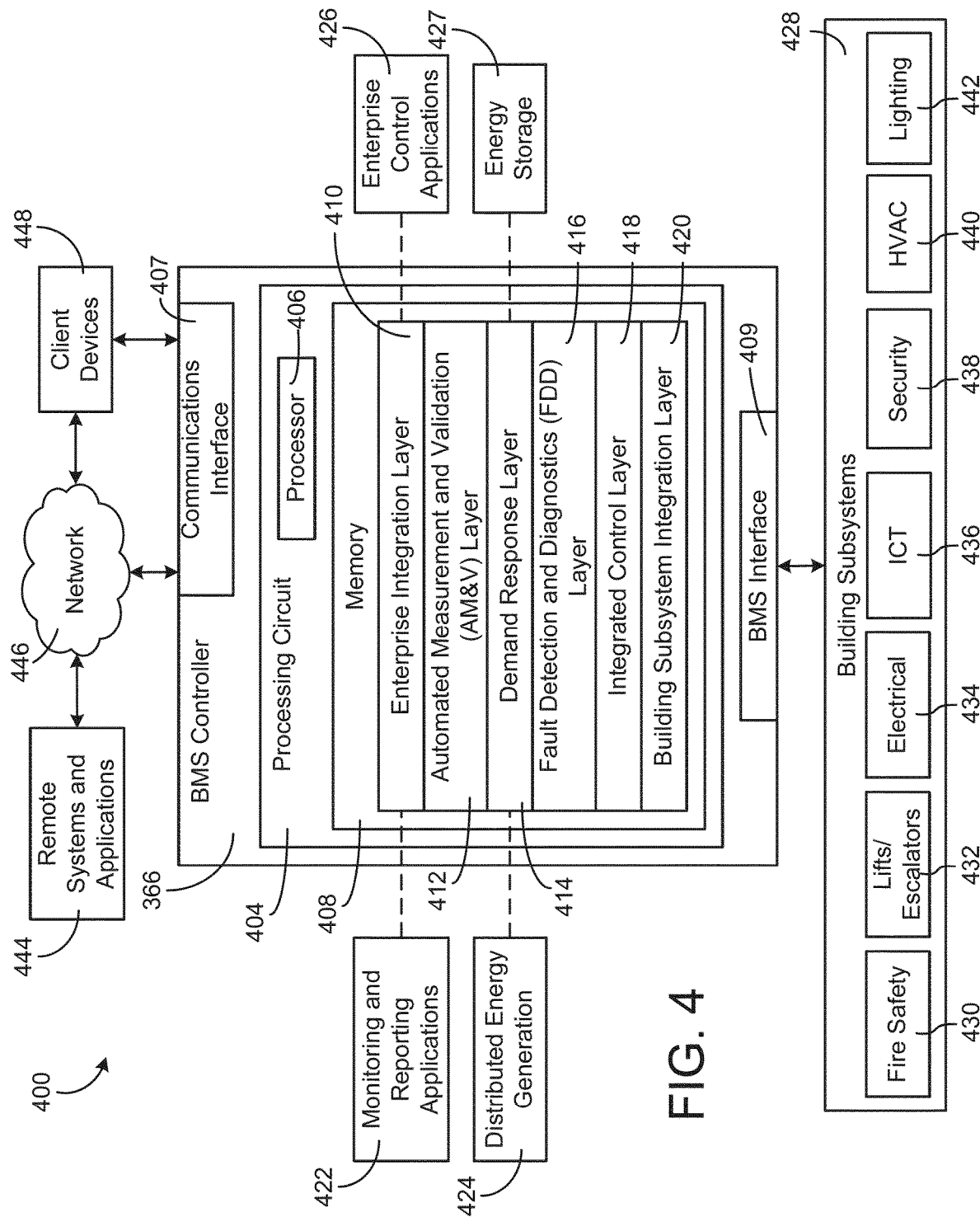
FIG. 4 is a block diagram of a building management system (BMS) which can be used to monitor and control the building of FIG. 1, according to an exemplary embodiment.
Figure 5:
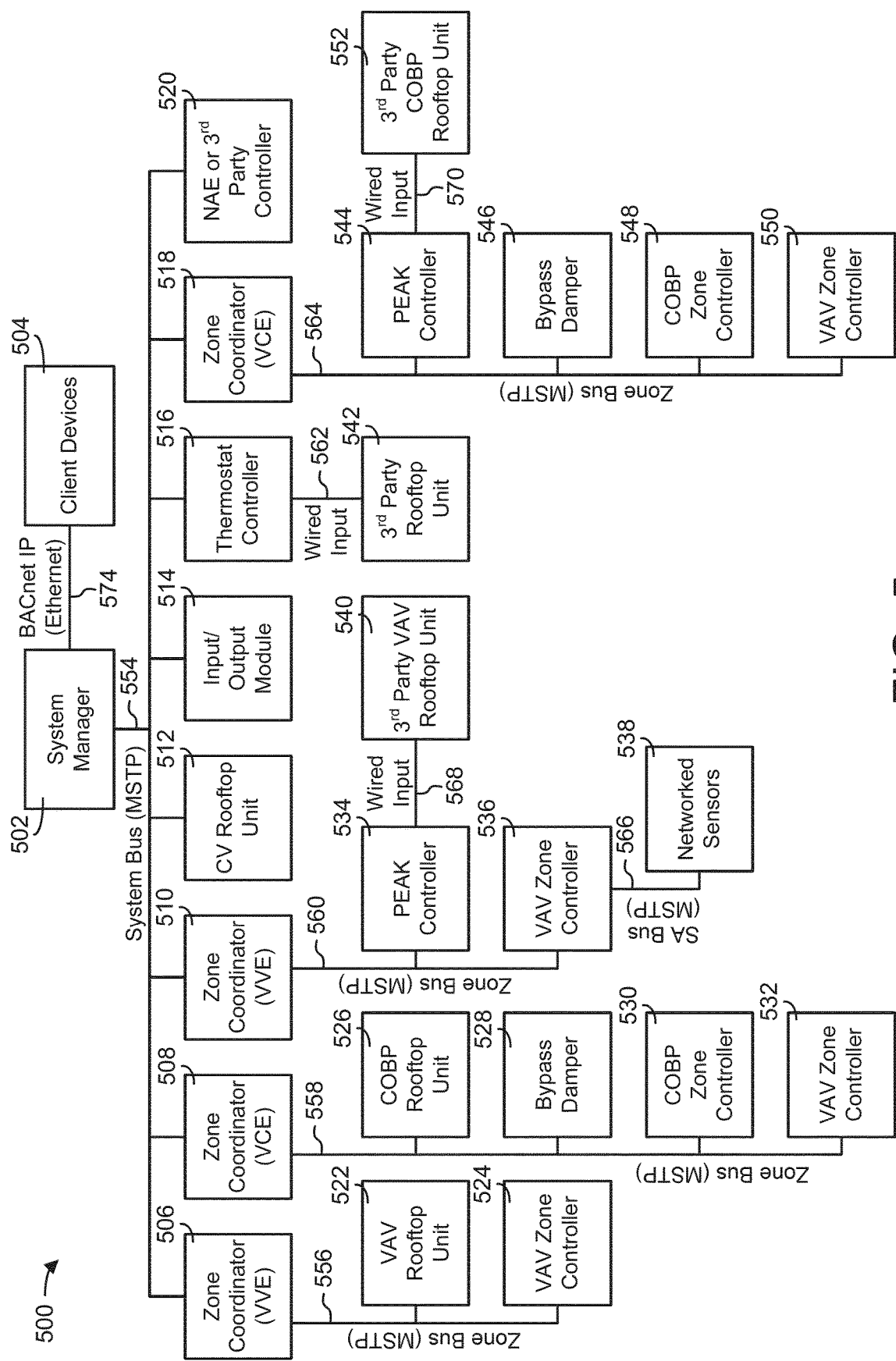
FIG. 5 is a block diagram of another BMS which can be used to monitor and control the building of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively.

Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

System Manager with Cost Target Optimization

Figure 6:
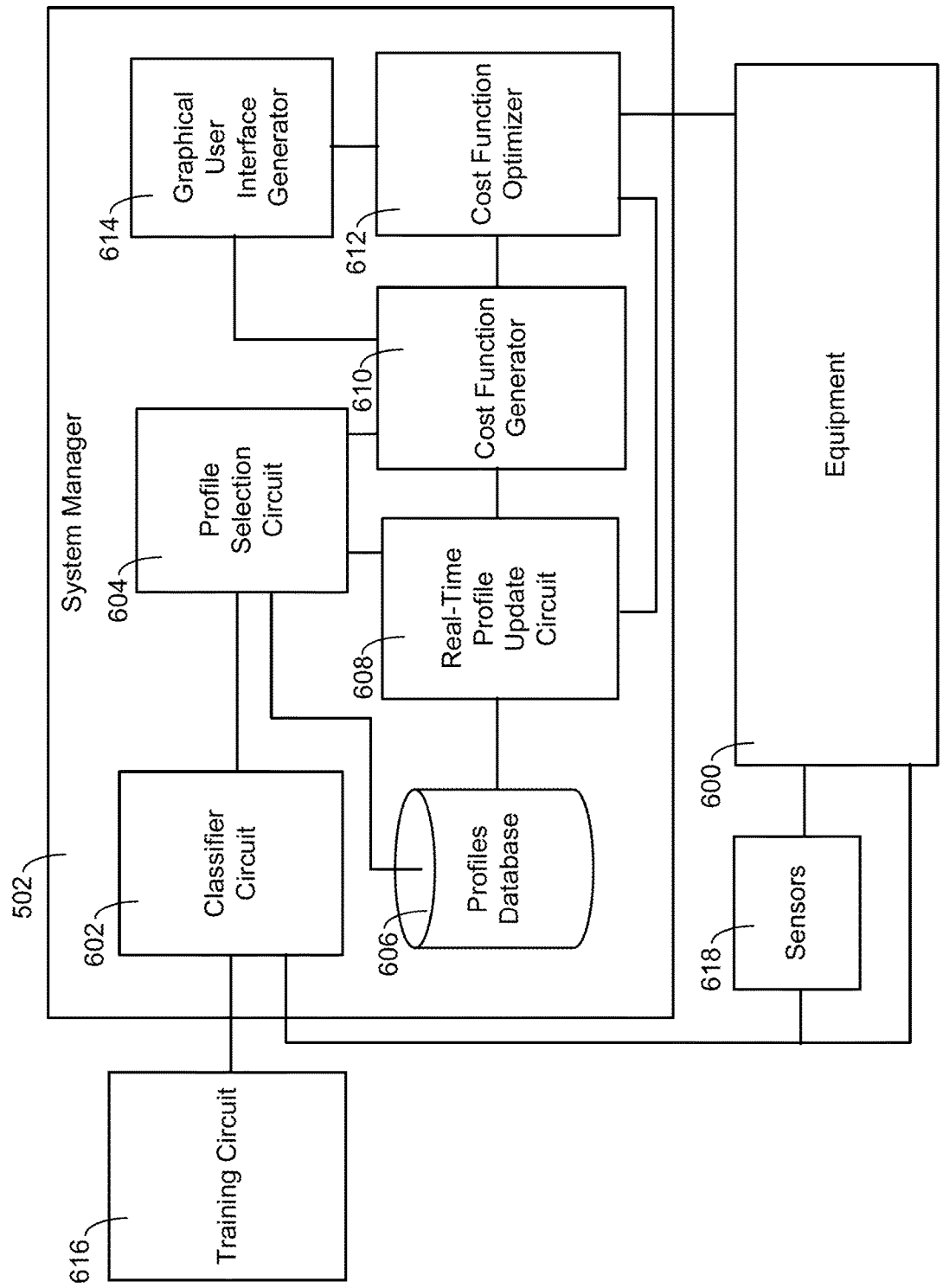
FIG. 6 is a block diagram of the system manager of FIG. 5, according to an exemplary embodiment.

Referring now to FIG. 6, a block diagram illustrating the system manager 502 in greater detail is shown, according to an exemplary embodiment. As described in detail below, the system manager 502 can be configured to generate a cost function that uses penalty terms to account for occupant comfort and optimize the cost function while constrained by a maximum energy cost to determine a control input for equipment 600. The system manager 502 can determine the penalty terms by identifying a classification for the state of the building using a neural network and then associating that classification with maximum and minimum temperature profiles. These and other functions of the system manager 502 are described in detail below.

The system manager 502 may be communicably coupled to equipment 600 and sensors 618. According to various embodiments, the equipment 600 includes the various HVAC equipment shown in FIGS. 1-5 (e.g., HVAC system 100, waterside system 200, airside system 300, and components thereof). Equipment 600 is operable to affect the indoor air temperature of one or more of a room, multiple rooms, a building, multiple buildings, etc. Sensors 618 provide measurements that facilitate the operation of equipment 600 and system manager 502. Sensors 618 may measure the indoor air temperature of a room or building, an outdoor air temperature, and/or a humidity of a room or building.

The system manager 502 is shown to include a classifier circuit 602, a profile selection circuit 604, a profiles database 606, a real-time profile update circuit 608, a cost function generator 610, a cost function optimizer 612, and a graphical user interface generator 614. The system manager 502 is communicable with a training circuit 616. As described in further detail below, the classifier circuit 602 uses a neural network and data about the equipment 600 and the building it serves to classify a current status of the building. The classifier circuit 602 provides the classification to the profile selection circuit 604, which associates the classification with a maximum temperature profile and a minimum temperature profile using a look-up table stored in the profiles database 606. The maximum temperature profile and the minimum temperature profile represent bounds on a range of comfortable temperatures for each time step in a planning period (e.g., each hour of the next 24 hours). The real-time profile update circuit 608 is configured to update the maximum temperature profile and/or minimum temperature profile in real-time based on a user change to a temperature setpoint or other user input.

The cost function generator 610 receives the maximum temperature profile and the minimum temperature profile and uses the profiles to generate a cost function. The cost function includes an energy consumption cost term and a penalty term defined by the maximum temperature profile and the minimum temperature profile. The cost function may be represented as:

$$\Sigma_{i=1}^{NH} C_i P_i \Delta t_i + \Sigma_{j=1}^{M} C_j \max_{R_j}(P_j) + \Sigma_{i=1}^{NH} \text{Soft}_i \Delta t_i + \Sigma_{i=1}^{NH} \text{Hard}_i \Delta t_i V_N(\theta, Z^N) = \Sigma_{k=1}^{N-h_{max}+1} \Sigma_{h=0}^{h_{max}} W(h) \|y(k+h) - \hat{y}(k+h|k-1, \theta)\|_2^2.$$

where NH is a total number of time steps in a period, $\Delta t_i$ is the length of each time step, $P_i$ is the power consumed by the equipment 600 in time step i, $C_i$ is the price per unit power charged by a utility company during time step i, $\text{Soft}_i$ is a soft penalty function, and $\text{Hard}_i$ is a hard penalty function. The term $\Sigma_{j=1}^{M} C_j \max_{R_j}(P_j)$ captures a maximum demand charge billed by a utility company for the maximum power requested for each time step between j=1 and M within a demand charge period. The cost function generator 610 may also set an inequality constraint to bound overall cost as less than a maximum energy consumption cost. In some embodiments, the maximum cost constraint sets a bound on the total value of the entire cost function above. In other embodiments the maximum cost constraint does not apply to the penalty terms (i.e., the value of $\Sigma_{i=1}^{NH} C_i P_i \Delta t_i + \Sigma_{j=1}^{M} C_j \max_{R_j}(P_j)$ is bound by the maximum cost constraint). An inequality constraint can therefore ensure that a user's budget for utility charges for a time period is not exceeded.

The cost function optimizer 612 receives the cost function from the cost function generator 610. The cost function optimizer 612 determines a temperature setpoint trajectory for the planning period that minimizes the cost function without exceeding the maximum cost constraint for the planning period. The temperature setpoint trajectory includes a temperature setpoint for each time step in the planning period. The cost function optimizer 612 may use a model predictive control approach to predict future temperatures, prices, etc. for the planning period to facilitate optimization over the planning period. The temperature setpoint trajectory is then provided to the equipment 600. The equipment 600 operates to affect the indoor air temperature of the building to track the temperature setpoint trajectory.

In some embodiments, the graphical user interface generator 614 is configured to generate a graphical user interface that visualizes the optimization problem faced by cost function optimizer 612 and allows a user to input the maximum energy consumption cost that defines the maximum cost constraint. Examples of such graphical user interfaces are shown in FIGS. 7-9 and described in detail with reference thereto.

Figure 7:
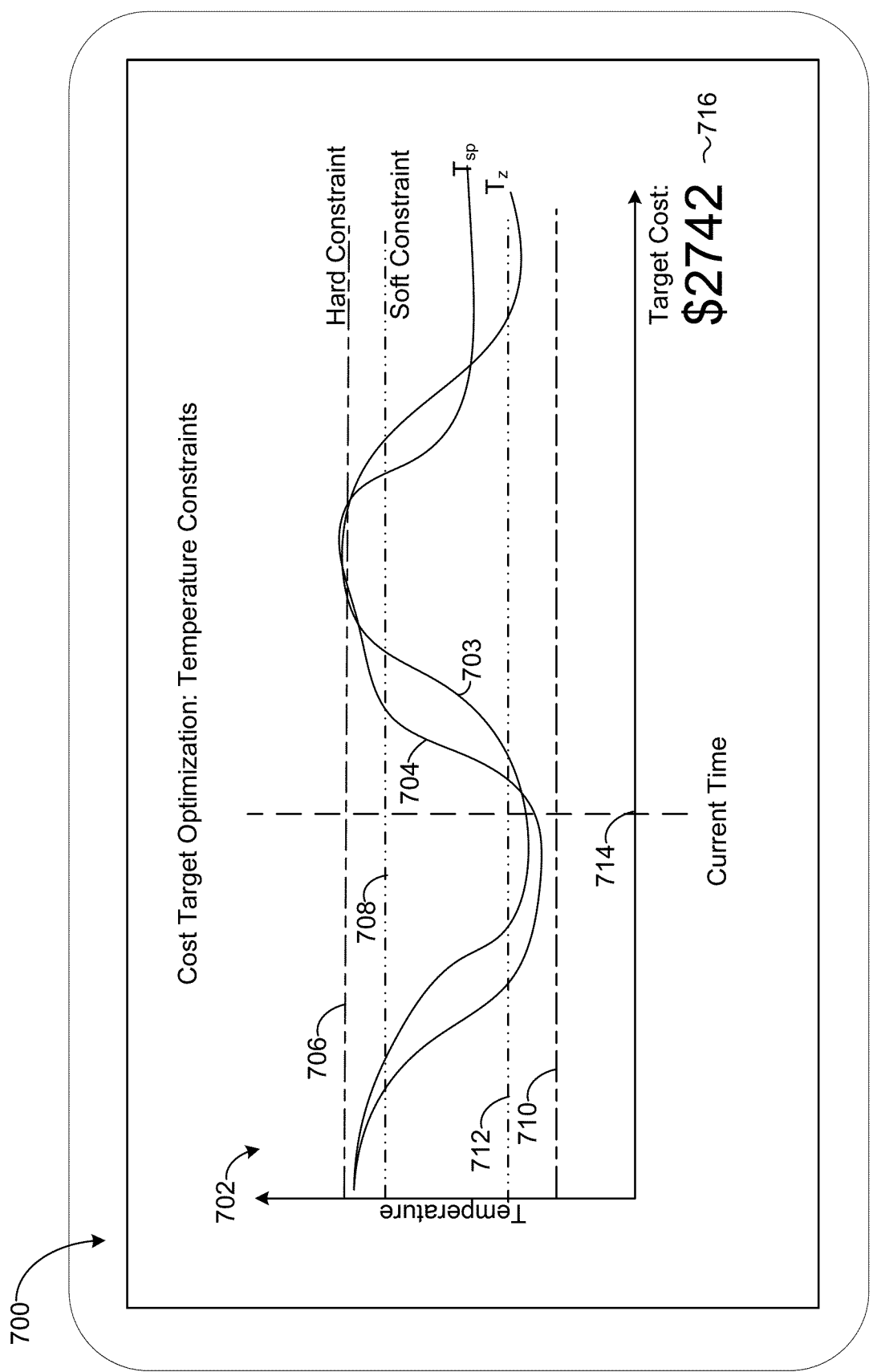
FIG. 7 is a graphical user interface showing a first graph that illustrates a cost target optimization problem solved by the system manager of FIG. 6, according to an exemplary embodiment.
Figure 8:
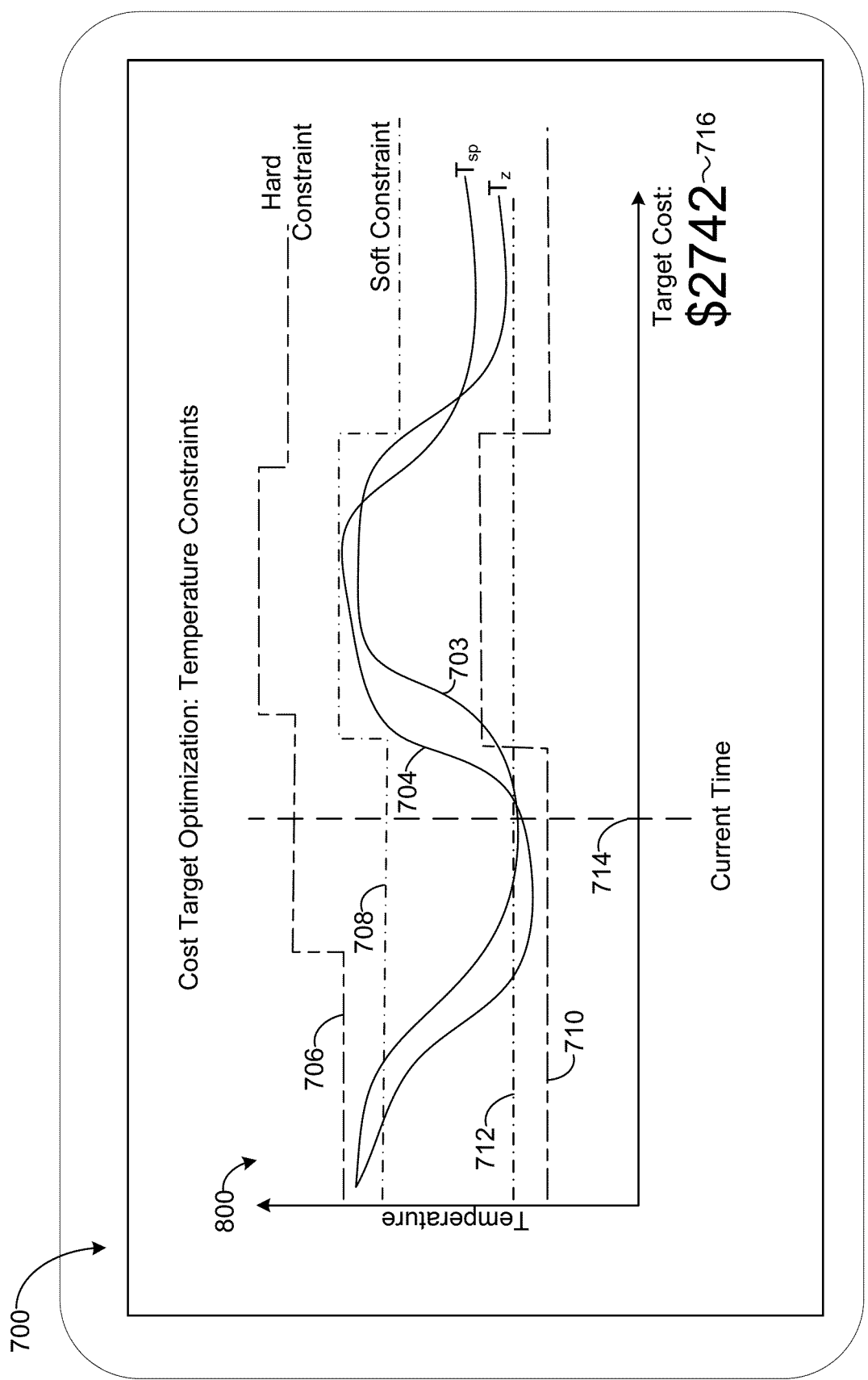
FIG. 8 is a graphical user interface showing a second graph that illustrates a cost target optimization problem solved by the system manager of FIG. 6, according to an exemplary embodiment.
Figure 9:
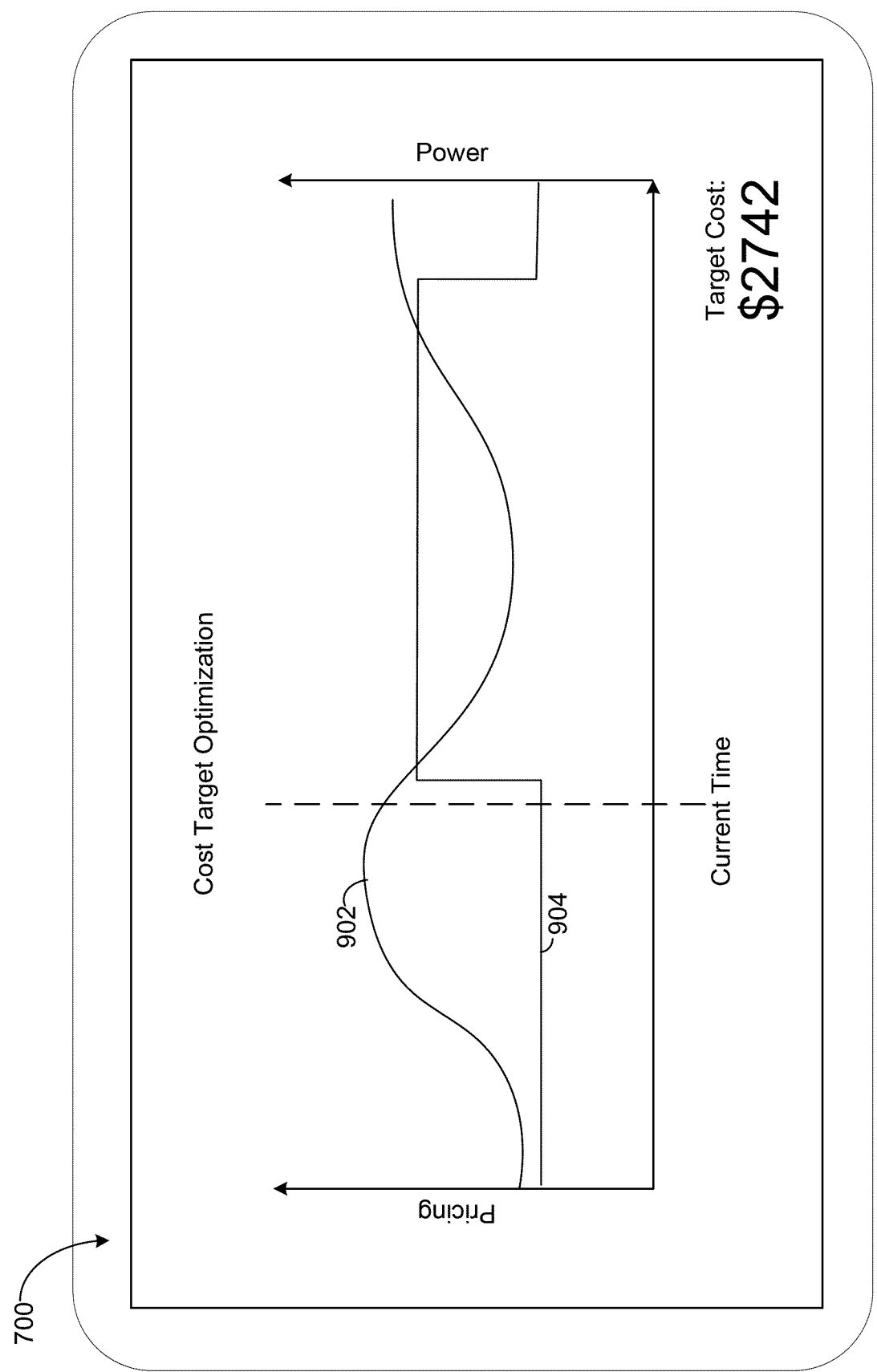
FIG. 9 is a graphical user interface showing a third graph that illustrates a cost target optimization problem solved by the system manager of FIG. 6, according to an exemplary embodiment.

Referring now to FIGS. 7-9, a graphical user interface 700 showing graph 702, graph 800, and graph 900 that illustrates the optimization problem solved by the cost function optimizer 612 is shown, according to an exemplary embodiment. FIG. 7 shows graph 702, FIG. 8 shows graph 800, and FIG. 9 shows graph 900. The graphical user interface 700 may be generated by the graphical user interface generator 614 and presented on a user's personal computing device (e.g., smartphone, tablet, personal computer), on a display of the equipment 600, or on some other interface.

Graph 702 of FIG. 7 shows an indoor air temperature $T_z$ line 703, a temperature setpoint line 704, a hard-constraint temperature maximum line 706, a soft-constraint temperature maximum line 708, a hard-constraint temperature minimum line 710, and a soft-constraint temperature minimum line 712. A bar 714 indicates the current time, such that lines 703-712 to the right of the bar 714 are in the future and lines 703-712 to the left of the bar 714 represent historical data. The graphical user interface 700 also shows target cost 716 that sets a maximum energy consumption cost for a planning period. The target cost 716 may be altered by a user to change the maximum energy consumption cost for the planning period. In some embodiments, the user may also alter the temperature constraints by repositioning the hard-constraint temperature maximum line 706, soft-constraint temperature maximum line 708, hard-constraint temperature minimum line 710, and/or soft-constraint temperature minimum line 712.

The hard-constraint temperature maximum line 706, soft-constraint temperature maximum line 708, hard-constraint temperature minimum line 710, and soft-constraint temperature minimum line 712 indicate the threshold values used in the penalty functions generated by the cost function generator 610. The soft constraint penalty function $\text{Soft}_i$ is zero when the indoor air temperature $T_z$ line 703 is between the soft-constraint temperature maximum line 708 and the soft-constraint temperature minimum line 712, and a soft penalty value when the indoor air temperature $T_z$ line 703 is above the soft-constraint temperature maximum line 708 or below the soft-constraint temperature minimum line 712. That is, $\text{Soft}_i$ applies a soft penalty value to the cost function when the indoor air temperature $T_z$ is outside a preferred temperature range. One example of the soft constraint penalty function $\text{Soft}_i$ is:

$$\text{Soft}_i = w_{soft} * \max(0, T_{z,i} - T_{max,soft,i}, T_{min,soft,i} - T_{z,i})$$

where $T_{max,soft,i}$ is the value of the soft-constraint temperature maximum line 708 at time step i, $T_{min,soft,i}$ is the value of the soft-constraint temperature minimum line 712 at time step i, $T_{z,i}$ is the value of the indoor air temperature line 703 at time step i, and $w_{soft}$ is the penalty weight applied to the soft penalty.

The hard constraint penalty function $\text{Hard}_i$ is zero when the indoor air temperature $T_z$ line 703 is between the hard-constraint temperature maximum line 706 and the hard-constraint temperature minimum line 710, and has a hard penalty value when the indoor air temperature $T_z$ line 703 is above the hard-constraint temperature maximum line 706 or below the hard-constraint temperature minimum line 710. That is, $\text{Hard}_i$ applies a hard penalty value to the cost function when the indoor air temperature $T_z$ is outside of a comfortable temperature range (i.e., the indoor air is uncomfortably cold or hot). The hard penalty value is substantially larger than the soft penalty value (e.g., 10 times larger, 100 times larger, 1000 times larger). One example of the hard constraint penalty function $\text{Hard}_i$ is:

$$\text{Hard}_i = w_{hard} * \max(0, T_{z,i} - T_{max,hard,i}, T_{min,hard,i} - T_{z,i})$$

where $T_{max,hard,i}$ is the value of the hard-constraint temperature maximum line 706 at time step i, $T_{min,hard,i}$ is the value of the hard-constraint temperature minimum line 710 at time step i, $T_{z,i}$ is the value of the indoor air temperature line 703 at time step i, and $w_{hard}$ is the penalty weight applied to the hard penalty ($w_{hard} > w_{soft}$).

The soft constraint penalty function $\text{Soft}_i$ and the hard constraint penalty function $\text{Hard}_i$ thereby incorporate occupant comfort into the cost function. Further, because $\text{Soft}_i$ and $\text{Hard}_i$ are implemented as penalty functions rather than inequality constraints on the optimization problem, the solution to the optimization problem may include allowing the indoor air temperature $T_z$ to drift to uncomfortable temperatures (i.e., exceed the soft or hard constraints) when the trade-off with energy consumption cost savings is great enough. Stated another way, the soft constraint penalty function $\text{Soft}_i$ and the hard constraint penalty function $\text{Hard}_i$ are included in the cost function to quantify occupant comfort. Optimizing the cost function thus includes optimizing occupant comfort.

Graph 800 of FIG. 8 also shows the indoor air temperature $T_z$ line 703, the temperature setpoint line 704, the hard-constraint temperature maximum line 706, the soft-constraint temperature maximum line 708, the hard-constraint temperature minimum line 710, and the soft-constraint temperature minimum line 712. Graph 800 is included to illustrate that the hard-constraint temperature maximum line 706, the soft-constraint temperature maximum line 708, the hard-constraint temperature minimum line 710, and the soft-constraint temperature minimum line 712 may vary over time. As described in detail below, the hard-constraint temperature maximum line 706, the soft-constraint temperature maximum line 708, the hard-constraint temperature minimum line 710, and the soft-constraint temperature minimum line 712 are determined based on a maximum temperature profile and a minimum temperature profile selected by the profile selection circuit 604 based on a classification determined by the classifier circuit 602.

Graph 900 of FIG. 9 shows a power line 902 and a pricing line 904. The power line 902 shows the operating power of the equipment 600 over time, including both past and predicted operating powers. The pricing line 904 shows the price of the power consumed by the equipment 600, for example as set by a utility company that provides electricity for the equipment 600. Graph 900 illustrates that energy prices may vary over time, and that the cost function optimizer 612 may consider changes in energy prices over time when determining a temperature setpoint trajectory for the planning period. For example, the cost function optimizer 612 may predict future energy prices for use in optimizing the cost function.

Figure 10:
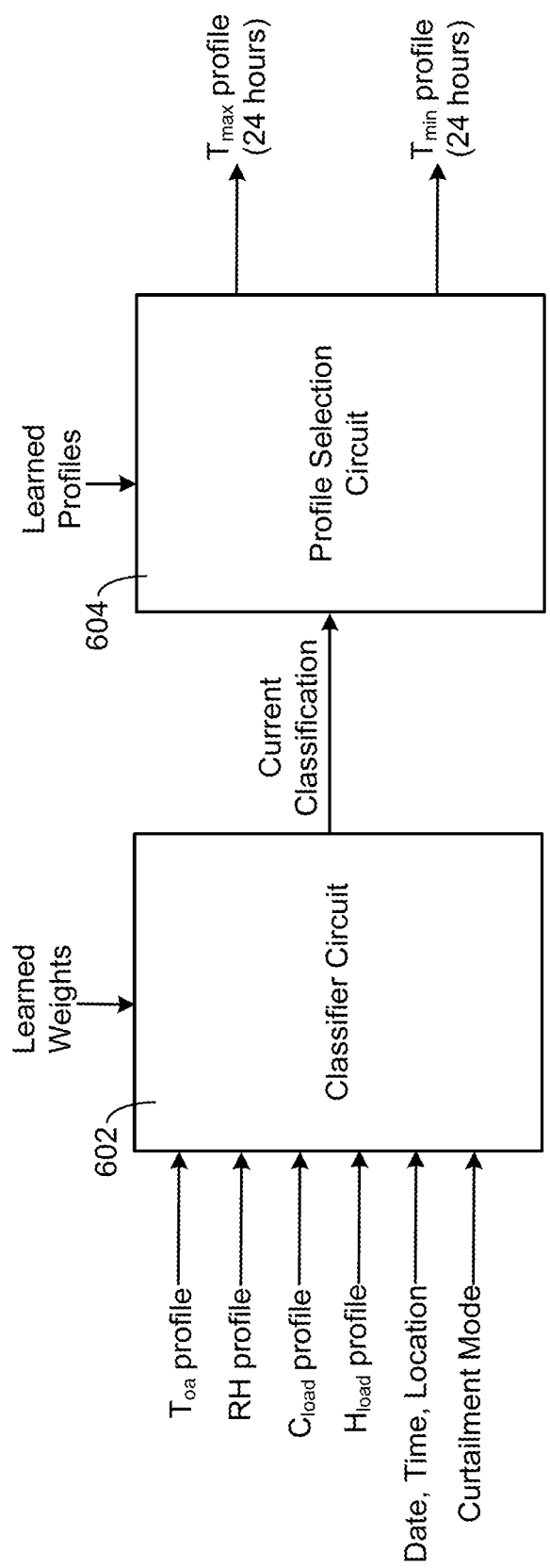
FIG. 10 is a block diagram of a classifier circuit and a profile selection circuit of the system manager of FIG. 6, according to an exemplary embodiment.

Referring now to FIG. 10, a detailed view of the classifier circuit 602 and the profile selection circuit 604 of the system manager 502 are shown, according to an exemplary embodiment.

The classifier circuit 602 receives various inputs and outputs a current classification for the building. The inputs may include an outdoor air temperature (Toa) profile that provides air temperature outside the building for multiple times steps in a time period. The Toa profile may be based on recorded measurements, weather forecasts, or some combination thereof. The inputs may also include a room humidity or relative humidity (RH) profile that provides the humidity of the room/building for multiple time steps in a time period. The RH profile may be based on recorded measurements, humidity predictions, or some combination thereof. The classifier circuit 602 also receives a cooling load ($C_{load}$) profile and a heating load ($H_{load}$) profile. The cooling load profile and the heating load profile capture the level of demand for cooling and heating for each time step in the time period. The classifier circuit 602 also takes in a date, time, and location of the equipment 600 and/or the building, as well as a curtailment mode for the building.

Figure 11:
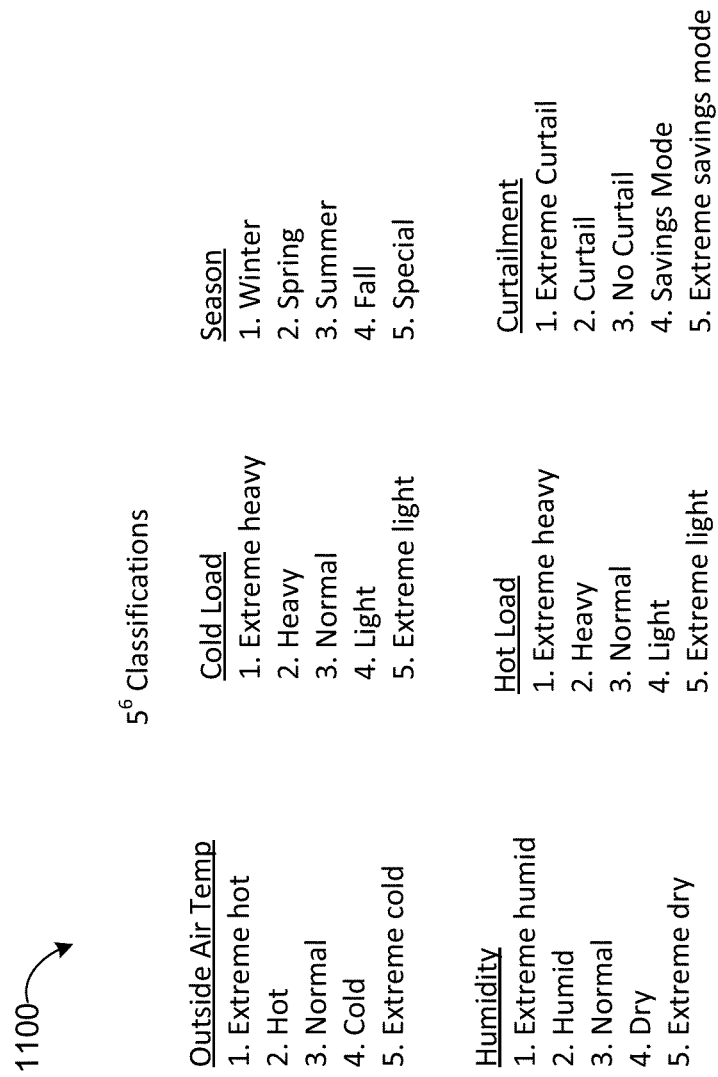
FIG. 11 is a table of classifications for use by the system manager of FIG. 6, according to an exemplary embodiment.

The classifier circuit 602 processes those inputs and determines a current classification for the building and equipment 600. The current classification is chosen from a set of possible classifications. In various embodiments, many classification systems are possible. In the embodiment shown, the set of possible classifications is illustrated by the table 1100 of FIG. 11. The table 1100 includes six categories, including outside air temperature Toa, room humidity RH, Cold Load, Hot Load, Season, and Curtailment. Each of the six categories has five associated statuses. To pick a current classification, one status is chosen from each of the six categories. Table 1100 thereby shows a set of possible classifications that includes $5^6 = 15625$ possible classifications.

To associate the inputs with a classification, the classifier circuit 602 utilizes a neural network, for example a convolutional neural network. A neural network is an artificially-intelligent software program that models neurons to create a program that associates inputs with outputs without requiring an explicit statement of the rules that determine the associations. A convolutional neural network is organized in layers, passing data from an input layer to an output layer via multiple hidden layers. The convolutional neural network uses learned weights in processing the data and generating outputs. Here, learned weights are generated by the training circuit 616 as described in detail below with reference to FIG. 12.

The classifier circuit 602 thereby receives inputs relating to the building and/or equipment 600 and uses learned weights in a convolutional neural network to determine a current classification. The classifier circuit 602 then provides the current classification to the profile selection circuit 604.

The profile selection circuit 604 associates the current classification with a $T_{max}$ profile and a $T_{min}$ profile. The profile selection circuit 604 may communicate with the profiles database 606 to access a look-up table of associations between each possible input and a $T_{max}$ profile and a $T_{min}$ profile. The profile selection circuit 604 may then find the current classification on the look-up table and identify the corresponding $T_{max}$ and $T_{min}$ profiles. Each $T_{max}$ profile defines an upper constraint on the inside air temperature for each time step over a planning period (e.g., each hour for 24 hours), while each $T_{min}$ profile defines a lower constraint on the outside air temperature for each time step over the planning period. In some embodiments, the $T_{max}$ and $T_{min}$ profiles define both hard constraints and soft constraints for each time step corresponding to the penalty functions $\text{Soft}_i$ and $\text{Hard}_i$ discussed above. That is, in such embodiments, the $T_{max}$ profile defines the soft-constraint temperature maximum line 708 and the hard-constraint temperature maximum line 706 of FIGS. 7 and 8, while the $T_{min}$ profile defines the soft-constraint temperature minimum line 712 and the hard-constraint temperature minimum line 710 of FIGS. 7 and 8. In other embodiments, the hard and soft constraints are derived in other some way from the $T_{max}$ and $T_{min}$ profiles (e.g., by using the $T_{max}$ profile as the soft constraint and adding a constant amount to determine the hard constraint).

Together, as shown in FIG. 10, the classifier circuit 602 and the profile selection circuit 604 thereby receive various inputs relating to the building and/or the equipment and determine temperature constraints for an optimization problem based on the inputs.

Figure 12:
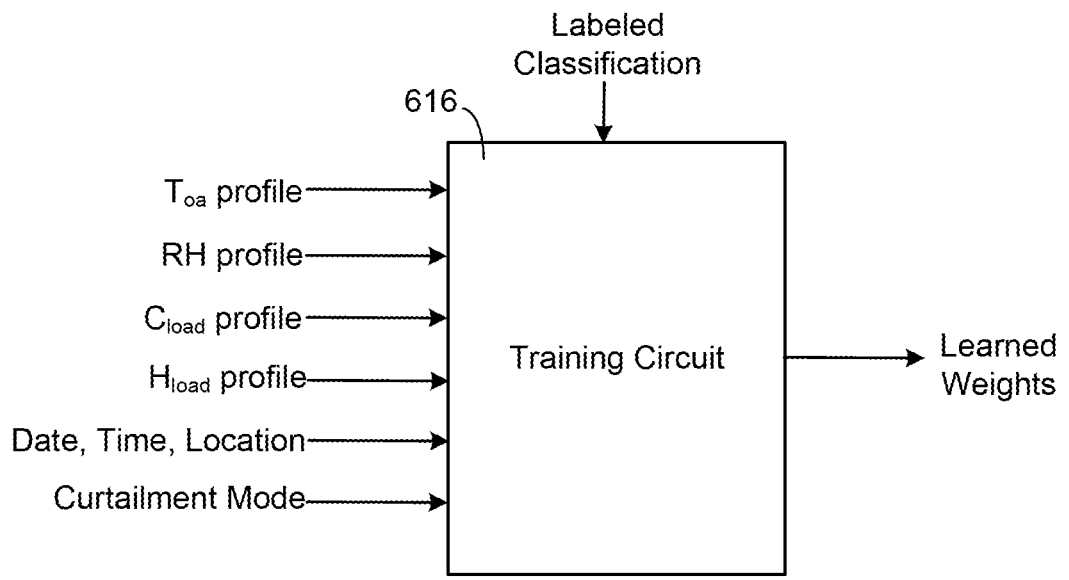
FIG. 12 is a block diagram of a training circuit for use with the system manager of FIG. 6, according to an exemplary embodiment.

Referring now to FIG. 12, the training circuit 616 is shown, according to an exemplary embodiment. The training circuit 616 determines learned weights for use in the neural network of the classifier circuit 602. The training circuit 616 may run 'offline' (i.e., outside of an operational control loop of the system manager 502), and may primarily be used during creation and installation of the system manager 502. The learned weights may be determined in advance of real-time operation of the system manager 502, thereby making the classification process substantially more efficient.

The training circuit 616 may use supervised learning, model-driven unsupervised learning, or some other approach. In supervised learning, the training circuit 616 receives input data for the same categories as the classifier circuit 602 (Toa profile, RH profile, $C_{load}$ profile, $H_{load}$ profile, date, time, location, curtailment mode), receives the current classification from a user (i.e., human) and learns weights for the neural network based on the association between the inputs and the user-determined current classification. By receiving a large dataset of inputs and outputs in this way, the training circuit 616 is supplied with data that allows the training circuit 616 to automatically determine a set of learned weights that tune the neural network to automatically make those same associations. Supervised learning may be conducted with real data from the building and/or equipment 600, or may be applied using simulated inputs and prompts for user determination of classifications based on those simulated inputs.

In a model-driven unsupervised learning approach, a model of the building and equipment 600 is used to determine current classifications (in contrast to having user-provided current classifications as in the supervised learning approach). The outputs are predicted by pre-programmable modeling techniques that are capable of supplying accurate classifications based on the same inputs but which may be too computationally expensive for use in on-line control. The model is thus used to generate the data received by the training circuit 616 and used to train the neural network (i.e., to determine the learned weights). The convolutional neural network of the classifier circuit 602 is substantially more efficient (i.e., faster, requires less computing resources, etc.) than the non-AI modeling approach used to generate data for unsupervised learning.

In various other embodiments, other now known or later developed approaches to training neural networks may also be used by the training circuit 616 to provide the learned weights used by the classifier circuit 602.

Figure 13:
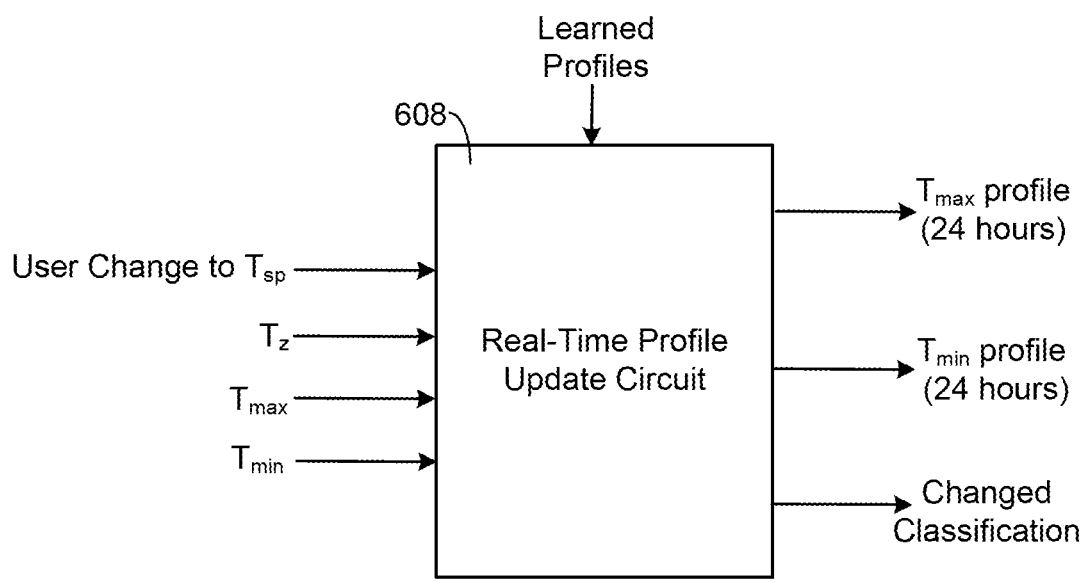
FIG. 13 is a block diagram of a real-time profile update circuit of the system manager of FIG. 6, according to an exemplary embodiment.

Referring now to FIG. 13, the real-time profile update circuit 608 of the system manager 502 is shown, according to an exemplary embodiment. The real-time profile update circuit 608 is configured to update the current classification, the $T_{max}$ profile, and/or the $T_{min}$ profile based on a user input to change a temperature setpoint.

The temperature setpoint supplied to the equipment may be determined by the system manager 502 (e.g., by the cost function optimizer 612), and may also be changed by a user (e.g., via a graphical user interface generated by the graphical user interface generator 614). When the user changes the temperature setpoint, the change in temperature setpoint $T_{sp}$ is provided to the real-time profile update circuit 608. The real-time profile update circuit 608 also receives the current indoor air temperature $T_z$ and the current temperature constraints ($T_{max}$ and $T_{min}$).

The real-time profile update circuit 608 determines whether the change in temperature setpoint $T_{sp}$ requires a change in the current classification, the $T_{max}$ profile, and/or the $T_{min}$ profile, and, if so, determines the new current classification, $T_{max}$ profile, and/or the $T_{min}$ profile. For example, if the change in $T_{sp}$ changes $T_{sp}$ to be greater than $T_{max}$, the real-time profile update circuit 608 may determine that the $T_{max}$ profile should be shifted upwards for the rest of the planning period. As another example, if the change in $T_{sp}$ changes $T_{sp}$ to be less than $T_{min}$, the real-time profile update circuit 608 may determine that the $T_{min}$ profile should be shifted downwards for the rest of the planning period. The real-time profile update circuit 608 may also communicate with the profiles database 606 to update the $T_{max}$ profile for the current classification accordingly. If $T_{sp}$ is changed to value between $T_{min}$ and $T_{max}$, the real-time profile update circuit 608 may determine that the current classification, the $T_{max}$ profile, and the $T_{min}$ profile need not be updated.

In some cases, the real-time profile update circuit 608 may determine that the user's change in $T_{sp}$ indicates that the current classification should be updated to a changed classification. The real-time profile update circuit 608 then accesses the profiles database 606 to determine a new classification and provides that changed classification to the profile selection circuit 604.

The real-time profile update circuit 608 thereby allows the system manager 502 to analyze the constraints on the cost-function optimization problem in real time to better minimize occupant discomfort.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building management system, comprising:
   HVAC equipment operable to affect an indoor air temperature of a building;
   a system manager configured to:
   obtain a cost function that characterizes a cost of operating the HVAC equipment over a future time period;
   obtain a dataset comprising a plurality of data points relating to the building;
   determine a current state of the building by applying the dataset to a neural network configured to classify the current state of the building;
   select a temperature bound associated with the current state;
   augment the cost function to include a penalty term that increases the cost when the indoor air temperature violates the temperature bound; and
   determine a temperature setpoint for each of a plurality of time steps in the future time period, the temperature setpoints achieving a target value of the cost function over the future time period; and
   a controller configured to operate the HVAC equipment to drive the indoor air temperature towards the temperature setpoint for a first time step of the plurality of time steps.

2. The building management system of claim 1, wherein the temperature bound comprises an upper limit on the indoor air temperature and a lower limit on the indoor air temperature.

3. The building management system of claim 2, wherein the penalty term is zero when the indoor air temperature is between the upper limit and the lower limit; and
   wherein the penalty term is non-zero when the indoor air temperature is above the upper limit or below the lower limit.

4. The building management system of claim 1, wherein the temperature bound comprises:
   a first temperature bound comprising a first upper limit on the indoor air temperature and a first lower limit on the indoor air temperature; and
   a second temperature bound comprising a second upper limit on the indoor air temperature and a second lower limit on the indoor air temperature.

5. The building management system of claim 4, wherein the penalty term increases the cost by a first amount when the first temperature bound is violated and by a second amount when the second temperature bound is violated, the second amount greater than the first amount.

6. The building management system of claim 5, wherein the first upper limit is less than the second upper limit and the first lower limit is greater than the second lower limit.

7. The building management system of claim 1, wherein the system manager is configured to generate a graphical user interface that prompts a user to input the target value of the cost function.

8. The building management system of claim 1, wherein the system manager is configured to store a mapping between a plurality of possible states of the building and a plurality of possible temperature bounds, the plurality of possible states comprising the current state and the plurality of possible temperature bounds comprising the temperature bound.

9. The building management system of claim 1, wherein the HVAC equipment comprises an airside system and a waterside system.

10. A method comprising:
    obtaining a cost function that characterizes a cost of operating building equipment over a future time period, the building equipment configured to affect an indoor air temperature of one or more buildings;
    obtaining a dataset comprising a plurality of data points relating to the one or more buildings;
    determining a current state of the one or more buildings by applying the dataset to a neural network configured to classify the current state of the one or more buildings;
    selecting a temperature bound associated with the current state;
    augmenting the cost function to include a penalty term that increases the cost when the indoor air temperature violates the temperature bound;
    determining a temperature setpoint for each of a plurality of time steps in the future time period, the temperature setpoints achieving a target value of the cost function over the future time period; and
    controlling the building equipment to drive the indoor air temperature towards the temperature setpoint for a first time step of the plurality of time steps.

11. The method of claim 10, wherein:
    the temperature bound comprises an upper limit on the indoor air temperature and a lower limit on the indoor air temperature;
    the penalty term is zero when the indoor air temperature is between the upper limit and the lower limit; and
    the penalty term is non-zero when the indoor air temperature is above the upper limit or below the lower limit.

12. The method of claim 10, wherein the temperature bound comprises:
    a first temperature bound comprising a first upper limit on the indoor air temperature and a first lower limit on the indoor air temperature; and
    a second temperature bound comprising a second upper limit on the indoor air temperature and a second lower limit on the indoor air temperature.

13. The method of claim 12, wherein:
    the first upper limit is less than the second upper limit and the first lower limit is greater than the second lower limit; and
    the penalty term increases the cost by a first amount when the first temperature bound is violated and by a second amount when the second temperature bound is violated, the second amount greater than the first amount.

14. The method of claim 10, comprising prompting a user to input the target value of the cost function via a graphical user interface.

15. The method of claim 10, comprising displaying a graphical representation of the temperature bound for the future time period and the temperature setpoints for the future time period.

16. The method of claim 10, wherein the building equipment comprises an airside system and a waterside system.

17. One or more non-transitory computer-readable media containing program instructions that, when executed by one or more processors, cause the one or more processors to perform operations comprising:
    obtaining a cost function that characterizes a cost of operating building equipment over a future time period, the building equipment configured to affect an indoor air temperature of one or more buildings;
    obtaining a dataset comprising a plurality of data points relating to the one or more buildings;
    determining a current state of the one or more buildings by applying the dataset to a neural network configured to classify the current state of the one or more buildings;
    selecting a temperature bound associated with the current state;
    augmenting the cost function to include a penalty term that increases the cost when the indoor air temperature violates the temperature bound;
    determining a temperature setpoint for each of a plurality of time steps in the future time period, the temperature setpoints achieving a target value of the cost function over the future time period; and
    controlling the building equipment to drive the indoor air temperature towards the temperature setpoint for a first time step of the plurality of time steps.

18. The non-transitory computer-readable media of claim 17, wherein:
    the temperature bound comprises an upper limit on the indoor air temperature and a lower limit on the indoor air temperature;
    the penalty term is zero when the indoor air temperature is between the upper limit and the lower limit; and
    the penalty term is non-zero when the indoor air temperature is above the upper limit or below the lower limit.

19. The non-transitory computer-readable media of claim 17, wherein the temperature bound comprises:
    a first temperature bound comprising a first upper limit on the indoor air temperature and a first lower limit on the indoor air temperature; and
    a second temperature bound comprising a second upper limit on the indoor air temperature and a second lower limit on the indoor air temperature.

20. The non-transitory computer-readable media of claim 19, wherein the one or more non-transitory computer-readable media store a mapping between a plurality of possible states of the one or more buildings and a plurality of possible temperature bounds, the plurality of possible states comprising the current state and the plurality of possible temperature bounds comprising the temperature bound.

* * * * *